United States Patent [19]

McIlwain

[11] 4,385,483
[45] May 31, 1983

[54] TRANSPORTING A CROP HARVESTING HEADER

[75] Inventor: Irwin D. McIlwain, Lancaster, Pa.

[73] Assignee: Sperry Corporation, New Holland, Pa.

[21] Appl. No.: 340,664

[22] Filed: Jan. 19, 1982

[51] Int. Cl.³ ............................................. A01B 73/00
[52] U.S. Cl. ....................................... 56/228; 56/15.2
[58] Field of Search ...................... 56/14.9, 15.1, 15.2, 56/15.6, 15.9–16.3, 228, DIG. 9

[56] References Cited

U.S. PATENT DOCUMENTS

| 2,833,105 | 5/1958 | Naery | 56/228 |
|---|---|---|---|
| 3,683,605 | 8/1972 | Jakobi | 56/228 |
| 4,209,963 | 7/1980 | Linn | 56/228 |
| 4,329,833 | 5/1982 | Witzel | 56/228 |

FOREIGN PATENT DOCUMENTS

| 1206648 | 9/1970 | United Kingdom | 56/DIG. 9 |
|---|---|---|---|
| 1431254 | 4/1976 | United Kingdom | 56/228 |

Primary Examiner—Robert A. Hafer
Assistant Examiner—John Weiss
Attorney, Agent, or Firm—Larry W. Miller; Frank A. Seemar; Darrell F. Marquette

[57] ABSTRACT

Method and apparatus for transporting a crop harvesting header, attachable to a combine to sever standing crop and initiate the crop harvesting process, is disclosed wherein the apparatus is mounted on and carried with the header in a retracted position during the normal crop harvesting process until it is desirable to transport the header. A first wheel assembly is pivotally movable into a ground engaging position to support a part of the weight of the header above the ground for transport. A second wheel assembly is removed from a mounting bracket on the back of the header and is connected to the cutterbar in longitudinal alignment with the first wheel assembly. An axle is provided to interconnect the first and second wheel assemblies to provide a stable wheeled undercarriage for the transport of the header. A tongue is extracted from within the frame of the header for connection to the rearward end of the combine, resulting in the header being towed as its own carrier in a transverse attitude behind the combine.

28 Claims, 7 Drawing Figures

TRANSPORTING A CROP HARVESTING HEADER

BACKGROUND OF THE INVENTION

The present invention relates generally to crop harvesting headers attachable to a combine to initiate the crop harvesting process and, more particularly, to improvements in the transportation of the headers over the ground from one work location to another.

Crop harvesting headers used to harvest grain crops, such as wheat, oats, barley, etc., generally include a reciprocating type cutterbar at its forwardmost location to sever standing crop material and initiate the crop harvesting process. Such grain headers typically include a reel to convey severed crop material rearwardly from the cutterbar and a consolidating mechanism, such as an auger, to consolidate the severed crop material and discharge it rearwardly through an appropriate opening in the header to the combine for further harvesting treatment.

With the advent of higher capacity harvesting machines, the size of the crop harvesting headers, as measured by the length of the cutterbar extending between the forwardly extending sidesheets at opposing ends of the cutterbar, has been steadily increasing. For example, it is not unheard of for the cutting width of current grain headers to approach thirty feet. Clearly, the trend is to increase the size of these headers as this practice decreases the amount of harvesting time necessary to harvest a given crop and increases the harvesting efficiency of the larger capacity combine.

However, increasing the size header creates problems of transporting the header from field to field or from one location to another, particularly if the path along which the header is transported involves the crossing or utilization of public roads. Mechanisms, such as taught in U.S. Pat. No. 3,245,695, which permit the towing of the crop harvesting header in a transverse attitude behind the combine, inherently have the problem of disposition of the wheeled undercarriage and supporting structure during the harvesting operation. Typically, such devices are left at the location in the field where the harvesting operation begins; however, by the time the harvesting is finished for the day, the combine may be several miles from its place of beginning. Other methods of transporting headers include utilization of a separate vehicle to carry the header from location to location. Therefore, it is highly desirable to provide a self-contained transporting mechanism to avoid the expense and inconvenience of providing additional transporting structures.

SUMMARY OF THE INVENTION

It is an object of this invention to overcome the aforementioned disadvantages of the prior art by providing a self-contained apparatus within a crop harvesting header to provide for the transportation of the header in a transverse attitude rearwardly of the combine.

It is an advantage of this invention that the wheeled structure for mobilely supporting the crop harvesting header off the ground during transport is carried with the header during the normal crop harvesting operation.

It is a further object of this invention that the transport apparatus for a combine header can be partially dismantled and stored within or carried on the header during the crop harvesting operation.

It is a feature of this invention that the number of connecting pins for connecting the various components to place the header in a transport mode is the same as the number of connecting pins used to store the various components on the header during the harvesting mode.

It is yet another object of this invention to pivotally attach a wheel assembly to the frame of the crop harvesting header so that it is easily carried by the header in a retracted position and simply and easily converted into a ground engaging position to initiate a conversion of the header from the harvest mode to the transport mode.

It is another advantage of this invention that the attachment tongue and the dismantled axle can be stored within the lower box beam of the header frame during the harvesting operation of the header.

It is another feature of this invention that the wheel assembly pivotally connected to the header frame includes a spring loaded locking pin for securing the wheel assembly in either its retracted or ground engaging position.

It is still another object of this invention to provide a method of transporting a combine header that is simple, convenient and easy to utilize.

It is a further object of this invention to provide a jack movable from an unobstructing position to a ground engaging position to stationarily support the crop harvesting header in its transport mode until it can be connected to the combine for towed transport.

It is a still further object of this invention to utilize the header as its own carrier for transport thereof from one location to another.

It is still another advantage of this invention that the conversion of the header from the harvest mode to the transport mode can be accomplished on either a rigid or a flexible header.

It is yet a further object of this invention to provide a method and apparatus for the transportation of a crop harvesting header in a transverse attitude rearwardly of the combine, which is inexpensive of manufacture, carefree of maintenance, facile in assemblage and simple and effective in use.

These and other objects, features and advantages are accomplished according to the instant invention by providing a method and apparatus for transporting a crop harvesting header, attachable to a combine to sever standing crop and initiate the crop harvesting process, wherein the apparatus is mounted on and carried with the header in a retracted position during the normal crop harvesting process until it is desirable to transport the header. A first wheel assembly is pivotally movable into a ground engaging position to support a part of the weight of the header above the ground for transport. A second wheel assembly is removed from a mounting bracket on the back of the header and is connected to the cutterbar in longitudinal alignment with the first wheel assembly. An axle is provided to interconnect the first and second wheel assemblies to provide a stable wheeled undercarriage for the transport of the header. A tongue is extracted from within the frame of the header for connection to the rearward end of the combine, resulting in the header being towed in a transverse attitude behind the combine.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
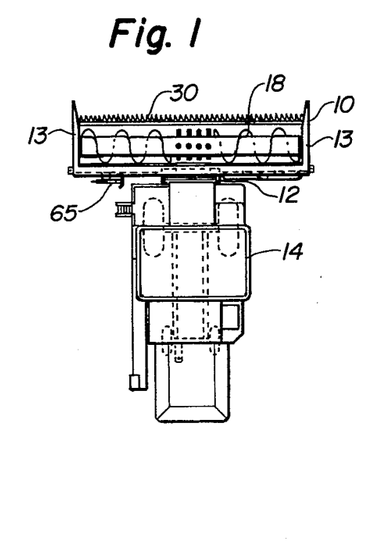
FIG. 1 is a diagrammatical plan view of a crop harvesting header, incorporating the principals of the instant invention, attached to the feeder house of a combine base unit in the harvest mode.

Referring now to the drawings and, more particularly, to FIG. 1, a diagrammatical plan view of a crop harvesting header attached to a combine base unit in a harvest mode can be seen. Any left and right references are used as a matter of convenience and determined by standing at the rear of the combine base unit, facing the forward end, the direction of travel. The crop harvesting header 10 is shown attached to the feeder house structure 12 through which crop material is conveyed to the combine 14 for harvesting treatment.

The header 10 normally includes a frame 11 supporting spaced apart sidesheets 13 defining the width of the header, a reciprocating cutterbar 30 forwardly disposed of the header 10 between the sidesheets 13 to sever standing crop material and initiate the crop harvesting process, a floor 16 extending rearwardly from the cutterbar over which severed crop material is conveyed, and an auger 18 operatively cooperating with the floor 16 to consolidate severed crop material and discharge it through a centrally located aperture 19 in the header 10 to the feeder house 12 which in turn conveys the severed crop to the combine base unit 14 for further harvesting treatment. Typically, a reel (not shown for reasons of clarity) is mounted between the sidesheets 13 above the cutterbar 30 to convey severed crop material over the floor 16 from the cutterbar 30 to the consolidating auger 18.

Figure 2:
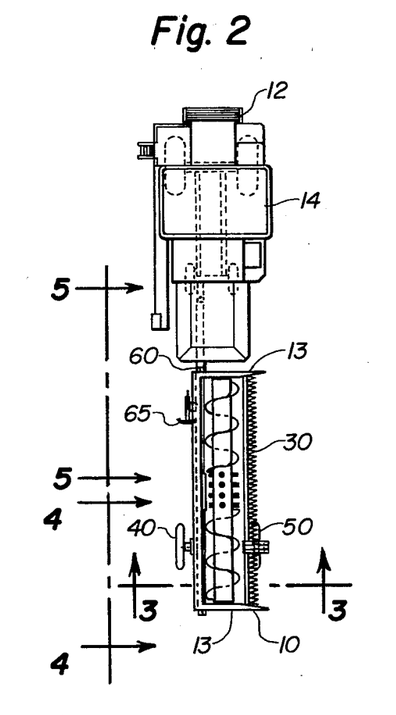
FIG. 2 is a diagrammatical plan view of a crop harvesting header converted to the transport mode and being towed behind the combine base unit.

According to the principals of the invention disclosed herein, the header 10 is convertible between a harvest mode, shown in FIG. 1, and a transport mode, shown in FIG. 2. By transporting the header 10 in a transverse attitude, as seen in FIG. 2, the overall transport width is significantly reduced from the normal harvest mode, seen in FIG. 1. By utilizing the apparatus carried by the header during the harvest mode, the header can be conveniently and easily converted to its transport mode and the header then becomes its own carrier.

Figure 3:
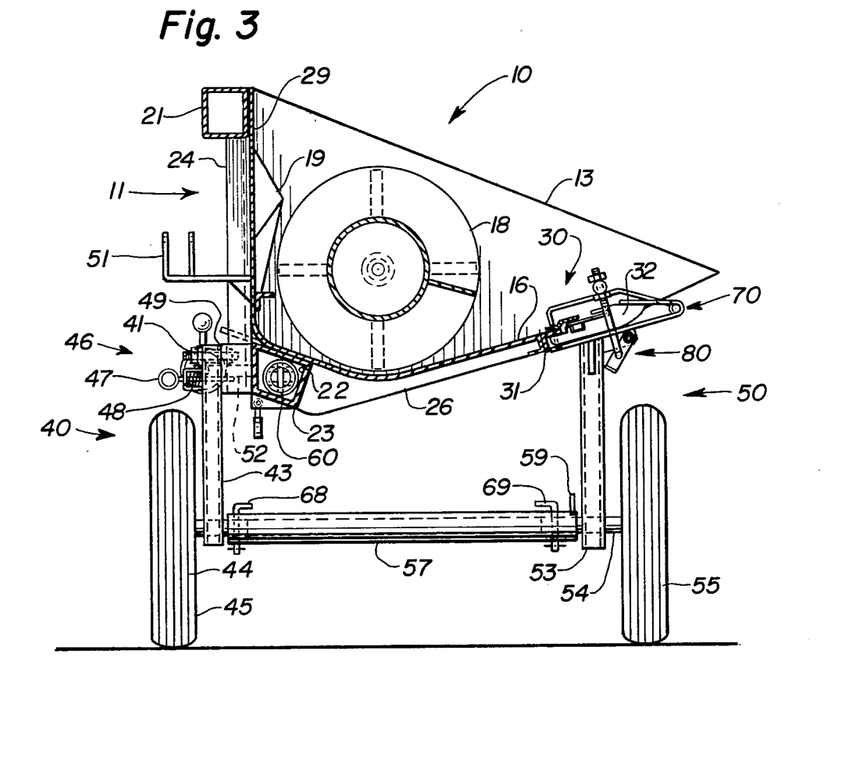
FIG. 3 is a cross sectional view of the crop harvesting header in the transport mode as shown in FIG. 2, taken along lines 3—3.
Figure 4:
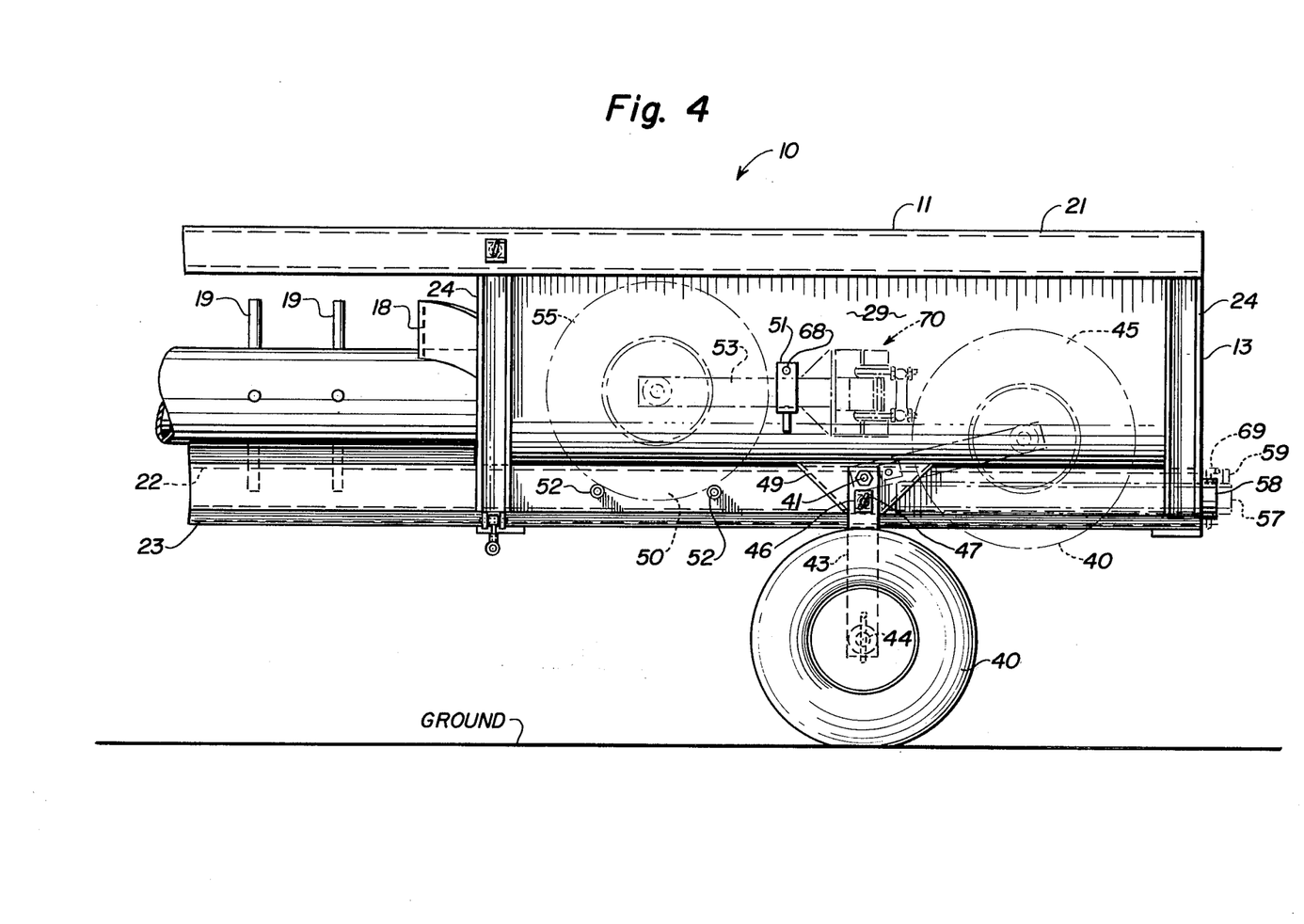
FIG. 4 is a partial rear view of the crop harvesting header in the transport mode as shown in FIG. 2, showing the right end of the header, corresponding to lines 4—4 in FIG. 2, in the harvest mode being shown in phantom.
Figure 5:
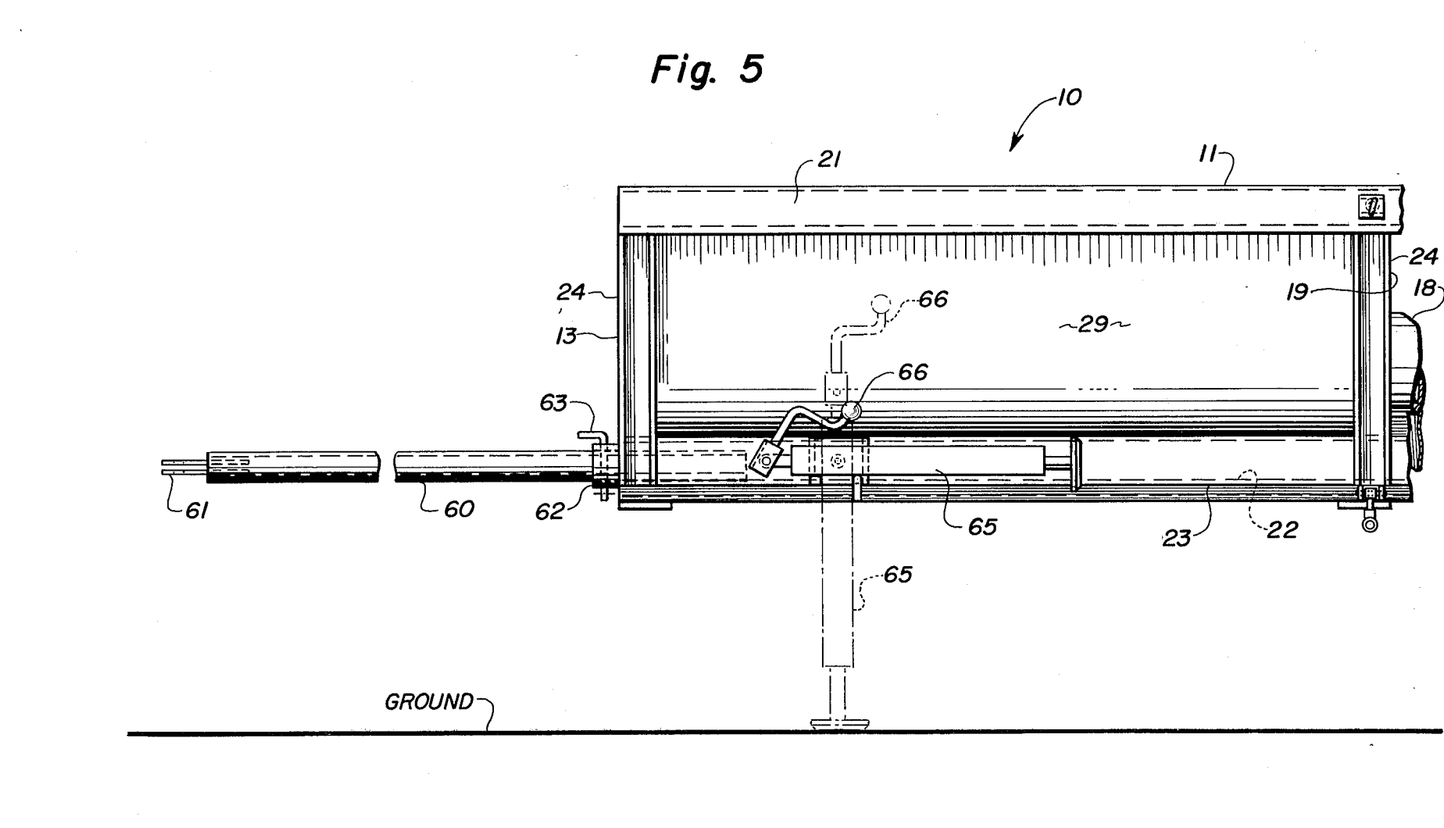
FIG. 5 is a partial rear view of the crop harvesting header in the transport mode as seen in FIG. 2, showing the left end of the header, corresponding to lines 5—5 of FIG. 2, the ground engaging support position of the jack being shown in phantom.

Referring now to FIGS. 3, 4 and 5, the details of the instant invention can readily be seen. The header frame 11 is generally comprised of an upper transverse box-like main beam 21 and a lower box-like transverse main beam 23 formed with a passageway 22 transversely therethrough and connected with the upper beam by a series of generally vertical frame members 24. A plurality of supporting ribs 26 are fixed to the lower beam 23 and project forwardly therefrom to support the floor 16 and the reciprocating cutterbar 30. As seen in FIG. 3, the floor 16 continues in a vertical manner adjacent the vertical frame members 24 to form the back wall 29 of the header in which the discharge opening 19 is located.

One skilled in the art will readily recognize that it is currently common practice to produce a rigid header, depicted in FIG. 3, in which the support ribs 26 are rigidly affixed to the lower beam 23 and a flexible header in which the support ribs 26 are pivotally connected to the lower beam 23 in such a manner that the cutterbar 30 is free to vertically flex to more closely follow undulation in the ground surface. Although the instant invention is shown in conjunction with a rigid header, a flexible header equipped with the apparatus in the manner shown, with one or more modifications to provide adequate support along the header cutterbar, can likewise be converted to a transport mode.

Figure 6:
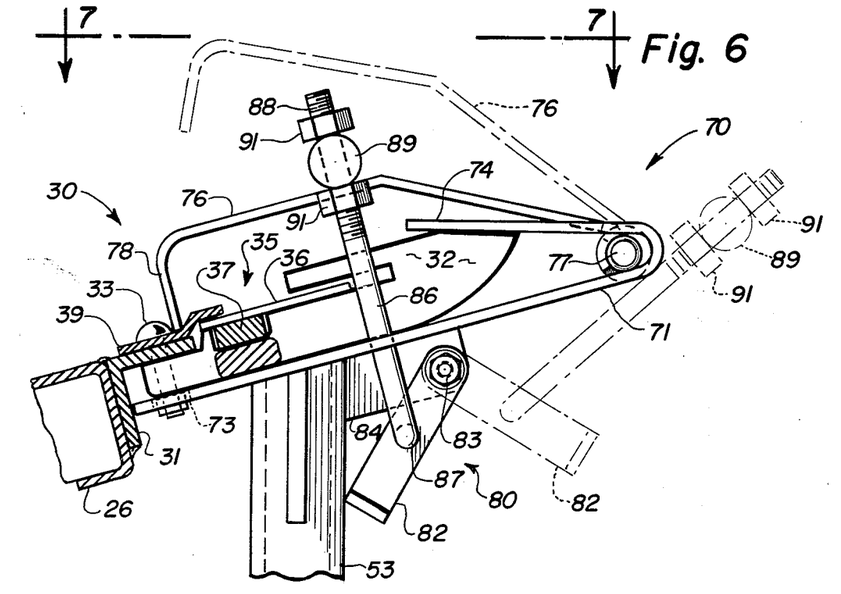
FIG. 6 is an enlarged detailed view, corresponding to the view seen in FIG. 3, of the clamping mechanism for attaching the second wheel assembly to the header cutterbar, the movement of the over center latching device and the clamping member being shown in phantom.
Figure 7:
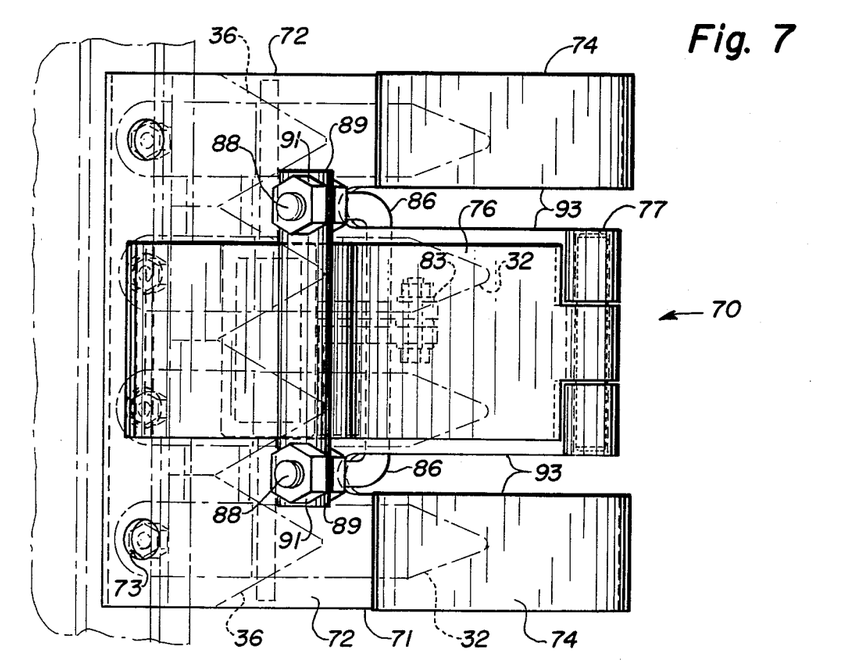
FIG. 7 is a plan view of the clamping mechanism seen in FIG. 6 and taken along lines 7—7.

As can be seen in FIGS. 3, 6 and 7, the cutterbar 30 includes a transverse primary support bar 31, shown in the form of an angle iron, affixed to the support ribs 26, as by welding. A series of mower guards 32 are connected to the primary support bar 31 by fastening members 33, such as bolts with nuts threaded onto them, in a transverse array along the cutterbar 30 between the sidesheets 13. A sickle assembly 35 is operatively received within the series of mower guards 32 for reciprocatory motion relative thereto. The sickle assembly is formed by mounting a series of triangularly shaped knife elements 36 to an elongated knife back 37. As is well known in the art, the reciprocatory movement of the knives 36 relative to the mower guards 32 causes a shearing action to sever standing crop material. A wear strip 39 is provided to help maintain the position of the sickle assembly 35 relative to the mower guards 32 during the cutting action, as is described in further detail in co-pending U.S. Ser. No. 203,173.

Referring now to FIGS. 3 and 4, the wheel assemblies 40,50 used in converting the header 10 from its harvest mode to its transport mode can be seen. The first wheel assembly 40 is pivotally connected to the frame 11 by pivot 41. The first wheel assembly 40 includes a support post 43 connected at one end to the pivot 41 and at its opposing end to a spindle 44, which, in turn, rotatably mounts the wheel 45. When pivoted downwardly into the ground engaging position, as seen in FIGS. 3 and 4, the first wheel assembly 40 supports a part of the weight of the header 10 above the ground for movement in a transverse direction.

During the harvest mode, the first wheel assembly is pivoted into a retracted position, shown in phantom in FIG. 4. To hold the first wheel assembly 40 in either the retracted position or the ground engaging position, a locking device 46 is provided. The locking device 46 includes a spring loaded locking pin 47 slidably received through the support post 43 adjacent the pivot 41 and engageable with a suitably apertured plate 49 stationarily affixed to the frame 11. The spring 48 biases the locking pin 47 into engagement with the plate 49.

The second wheel assembly 50 is carried within a mounting bracket 51 and supported on support dowels 52 affixed to the frame 11 adjacent the retracted position of the first wheel assembly 40. One skilled in the art will readily realize that other arrangements, within the scope and principals of the instant invention, for carrying the first and second wheel assemblies on the header during the harvesting mode, beside that depicted in FIG. 4, are possible. For example, by rearranging the position of the mounting bracket 51 and the support dowels 52 and providing the retracted position of the first wheel assembly 40 to swing to the left, as viewed in FIG. 4, rather than to the right, it would be possible to provide a nesting arrangement between the first and second wheel assemblies 40 and 50, with the second wheel assembly 50 being positioned at least partially between the wheel 45 and the header frame 11.

The second wheel assembly 50 is generally similar in construction to the first wheel assembly 40 in that it includes a support post 53 having a spindle 54 affixed to one end for the rotatable mounting of a wheel 55. The opposing end of the support post 53 is attached to a clamping mechanism 70, which is operable to detachably connect the second wheel assembly 50 to the cutterbar 30 for mobilely supporting a portion of the weight of the header 10 for movement in a transverse direction.

As can be seen in FIGS. 3, 4 and 5, the lower transverse beam 23 can be used to store an axle 57 adjacent the mounting of the wheel assemblies 40,50 to the frame 11. Spindles 44 and 54 are adapted for connection to the axle 57 to provide stability between the first and second wheel assemblies 40,50 and thereby form a stable undercarriage for the transportation of the header 10. The lower beam 23 is provided with a retension collar 58, best seen in FIGS. 3 and 4, to prevent the axle 57 from being unintentionally removed from the lower beam 23. A tab 59 is affixed to one end of the axle 57 to prevent it from sliding entirely within the passageway 22 of the lower beam 23.

At the opposing end of the lower beam 23, a tongue 60 is telescopically received within the passageway 22. A clevis 61 connected to the end of the tongue 60 serves as an attachment mechanism for connecting the header 10 to the combine base unit or another source of motive power. A positioning collar 62 affixed to the frame 11 and the corresponding pin 63 are cooperable with the tongue 60, having a series of apertures therethrough which are alignable with the pin 63, enable the clevis 61 to be positioned at any given length from the sidesheet 13 of the header 10.

A jack 65 is pivotally mounted to the frame 11 of the header 10 adjacent the tongue 60 at a position spaced from the pivotal mounting 41 of the first wheel assembly 40. The jack 65 is pivotally positionable between an unobstructing position, seen in solid lines in FIG. 5, and a ground engaging position, shown in phantom in FIG. 5. During the conversion of the header 10 from the harvest mode to the transport mode, the jack 65 stationarily supports a part of the weight of the header 10 above the ground until the clevis 61 can be connected to the towing vehicle. The handle 66 is used to manipulate the length of the jack 65, as is well known in the art.

Connecting pins 68 and 69 are used to detachably connect the axle 57 to the spindles 44 and 54, respectively. Connecting pin 68 is utilized with the mounting bracket 51 to maintain the second wheel assembly 50 in its mounted position during the harvest mode. Connecting pin 69 is utilized with the retension collar 58 to maintain the axle 57 within the passageway 22 of the lower beam 23 while the header 10 is in the harvest mode. Although connecting pins 63, 68 and 69 are of identical size and shape, it should be noted that the number of pins utilized to store the transport components during the harvest mode is equal to the number of connecting pins utilized to convert the header to the transport mode. As a result, there are no loose pins to become lost during one mode or the other.

The clamping mechanism 70 is utilized to detachably connect the second wheel assembly 50 to the cutterbar 30. A main body member having first generally planar portion 72 is mounted to the end of the support post 53 at an oblique angle to the line of the support post 53 to correspond to the angle of the cutterbar 30 relative to the vertical frame members 24. When clamped into position, the first portion 72 engages the underside of the mower guards 32 to which the second wheel assembly 50 is to be connected. The first portion 72 has a series of holes 73 therein to receive the nut and the portion of the fastening bolts 33 extending below the underside of the mower guards 32. A second planar portion 74 of the main body member 71 is integrally formed with the first portion 72 and engages at least part of the upper side of a part of the mower guards 32 to which the second wheel assembly 50 is attached. A clamping member 76 is pivotally connected to the main body member 71 at pivot 77. The clamping member 76 is of a shape to arch upwardly over the mower guards 32 and includes a downwardly depending leg 78 that engages the cutterbar 30 at a suitable location, such as along the formed wear strip 39.

An overcenter locking member 80 is operable to force the clamping member 76 downwardly into engagement with the cutterbar 30 to maintain the main body member 71 into engagement with the underside of the mower guards 32. The fastening members 33 projecting downwardly through the first portion 72 of the main body member 71 help maintain the main body member 71 in the desired position. The locking mechanism 80 includes a latching member 82 pivotally connected at pivot 83 to a tab 84 projecting from the support post 53. A U-shaped member 86 is pivotally connected to the latching member 82 at a point 87 spaced from the pivot 83.

A clamping bar 89 interconnects the spaced apart legs 88 of the U-shaped member 86. The legs 88 are threaded to engage adjustably positionable nuts 91 such that the position of the clamping bar 89 relative to the pivotal connection 87 can be selectively adjusted to vary the pressure exerted by the locking mechanism 80 on the clamping member 76 to hold the clamping mechanism 70 into the desired position. The main body member 71 includes a pair of spaced apart slots 93 to permit the passage of the legs 88 of the U-shaped member 86 when the clamping mechanism 70 is locked into place. The solid lines of FIG. 6 show the relative position of the individual components of the clamping mechanism 70 when in the locked position, the phantom lines showing a released position of the clamping member 76 and the locking mechanism 80.

As can be seen in FIG. 7, the second portion 74 of the main body member 71 is positioned both to the left and the right of the clamping member 76. Although it is shown in FIG. 7 that each left and right second portion 74 engage one of the mower guards 32, it should be realized that the body member 71 could be made larger to engage more than the four mower guards depicted in FIG. 7. More particularly, if a flexible header is to be transported with the apparatus described above, it would be desirable to provide a clamping mechanism 70 of sufficient size to overlap two ore more of the support ribs 26, so as to provide ample support for the flexible cutterbar 30. Although the first and second portions 72,74 of the main body member 71 are depcited as being planar in cross section, an alternative embodiment would involve shaping the first and/or second portions 72,74 to more precisely conform to the shape of the mower guards 32 to which they engage.

To convert a crop harvesting header equipped according to the principles of the instant invention as described above, from the harvest mode to the transport mode, it is necessary for the operator to raise the header 10 above the ground a predetermined distance greater than the height of either of the wheel assemblies 40,50 so that there is sufficient room above the ground to convert the header to the transport mode. The following procedure can be accomplished by the following enumerated steps in practically any sequence prior to lowering the header to the ground. The wheel assembly 40 is moved from its retracted position to its ground engaging position by extracting the locking pin 47 from one aperture in the plate 49 and rotating the support post 43 about the pivot 41 until the locking pin 47 reengages the appropriate aperture in the plate 49.

The second wheel assembly 50 is dismounted from its stored position in the mounting bracket 51, the connecting pin 68 being removed from the bracket 51 for later use. The second wheel assembly 50 is positioned in longitudinal alignment, i.e., directly forwardly of, the ground engaging position of the first wheel assembly 40. The main body member 71 of the clamping mechanism 70 is positioned over the appropriate mower guards 32 such that the second portion is engaging the upper side of the mower guards 32. The clamping member 76 is then swung into position such that the depending leg 78 is engageable with the wear strip 39.

The clamping member 76 is locked into place when the clamping bar is moved into its locking position, as seen in solid lines in FIG. 6, with the legs 88 of the U-shaped member 86 being received within the slots 93 in the main body member 71. The movement of the latching member 82 such that the pivot 87 is positioned between the pivot 83 and the support post 53 locks the locking mechanism 80 in an overcenter relationship. While clamping the clamping mechanism 70 into place as noted above, the first portion 72 of the main body member 71 is positioned such that the holes 73 are aligned with the fastening members 33 extending below the underside of the mower guards 32.

Prior to finally fixing the clamping mechanism 70 into its locked position, the axle 57 is withdrawn from the passageway 22 of the lower beam 23 by extracting the connecting pin 69 from the retention collar 58 and pulling the axle outwardly. The axle 57 is slipped over the spindles 44,54 while there is still sufficient movement in the connection of the second wheel assembly 50 to the cutterbar 30 to permit this operation. After clamping the clamping mechanism 70 into its locked position, the connecting pins 68,69 are utilized to connect the axle to the spindles 44,54, respectively. As is well known in the art, cotter pins or the like can be used to prevent the connecting pins 68 and 69 from accidentally withdrawing from the position in which they have been placed.

At the left end of the header 10, the jack 65 is lowered from its unobstructing position to a ground engaging position and the handle 66 manipulated until the jack 65 is of the desired length. The connecting pin 63 is withdrawn from the positioning collar 62 and the tongue 60 extracted from the passageway 22 of the lower beam 23 until the desired distance between the celvis 61 and the sidesheet 13 is obtained. The connecting pin 63 is then reinserted through the positioning collar 62 and through the tongue 60 to lock the tongue 60 in the desired position.

At this point in time, the operator can lower the header 10 until the weight of the header is resting on the first and second wheel assemblies 40,50 and the jack 65. The first and second wheel assemblies 40,50 and the jack 65 providing a three point stance for stationarily supporting the header 10 above the ground until the base unit can be attached to the clevis 61. After the header 10 has been disconnected from the combine base unit 14, the base unit 14 can be positioned until the clevis 61 is attachable to a suitable attachment at the rear of the base unit 14. After the clevis has been connected, the jack 65 can be disengaged from the ground surface and returned to its unobstructing position, as the header is then supportable on the first and second wheel assemblies 40,50 and the tongue 60. The header 10 can then be towed to the next desired location without the use of additional transport structures, as the frame 11 of the header 10 becomes the carrying structure for the header 10 itself.

The conversion of the header from its transport mode to the harvest mode is substantially the reverse of the procedure enumerated above. The jack 65 is moved from its unobstructing position to the ground engaging position to stationarily support the header 10 above the ground. The base unit 14 is detached from the clevis 61 and reconnected to the header 10 such that the header 10 is mounted in its harvesting position on the feeder house 12. The header 10 can then be raised off the ground so that the jack 65 and the wheel assemblies 40,50 are no longer supporting the weight of the header. At this time the tongue 60 can be retracted into the passageway 22 of the lower beam 23; the jack 65 returns to its unobstructing position; the axle 57 disconnected from the spindles 44,54 and returned in its resting position within the passageway 22 in the lower beam 23; the second wheel assembly 50 disconnected from the cutterbar 30 and remounted in the mounting bracket 51 and on the support dowels 52; and the first wheel assembly 40 pivoted to its retracted position with the locking pin 47 appropriately engaged with the apertured plate 49. The connecting pins 63, 68 and 69 are used to store the tongue 60, the second wheel assembly 50 and the axle 57, respectively, so that there are no extra connecting pins to get lost before reconversion to the transport mode.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a crop harvesting header attachable to a mobile base unit and operable to sever standing crop material to initiate the crop harvesting process and to convey the severed crop to the base unit for further harvesting treatment, said header having a frame including a transverse upper main beam, a transverse lower main beam connected to said upper beam by a plurality of generally vertical frame members, a plurality of forwardly projecting support ribs connected to said lower beam, and two opposing sidesheets supported by said upper and lower beams and defining the transverse width of said header; a transverse cutterbar supported by said support ribs between said sidesheets and forwardly of said lower beam to sever standing crop material, said cutterbar having a primary support member connected to said support ribs and extending between said sidesheets; and conveying means for discharging severed crop material from the header toward the base unit, the improvement comprising:
 a first wheel assembly pivotally connected to said frame and movable between a retracted position and a ground engaging position to mobilely support a part of the weight of said header above the ground when in said ground engaging position for movement thereof in a transverse direction;
 a second wheel assembly detachably connectable to said cutterbar forwardly of said first wheel assembly to mobilely support a part of the weight of said header above the ground when said second wheel assembly is connected to said cutterbar for movement of said header in a transverse direction; and
 attachment means connected to said header frame adjacent one of said sidesheets for the detachable connection of said header to a source of motive power for movement of said header in a transverse direction after being detached from said base unit.

2. The crop harvesting header of claim 1 wherein said second wheel assembly is connectable to said cutterbar in longitudinal alignment with said first wheel assembly, said first and second wheel assemblies being interconnected by an axle to provide stability between said first and second wheel assemblies.

3. The crop harvesting header of claim 2 wherein each of said wheel assemblies includes a support post generally vertically positioned when the respective said wheel assembly is operatively supporting said header above the ground, a spindle extending through said support post and generally perpendicular thereto, said spindle having a first end and an opposing second end, and a wheel rotatably mounted on the first end of said spindle, said second end of said spindle being adapted for connection to said axle.

4. The crop harvesting header of claim 3 wherein said first wheel assembly support post is pivotally connected to said header frame, said second wheel assembly support post being attached to clamping means for detachably connection said second wheel assembly to said cutterbar.

5. The crop harvesting header of claim 4 wherein said first wheel assembly includes locking means for securing said first wheel assembly in both said retracted position and said ground engaging position.

6. The crop harvesting header of claim 5 wherein said locking means comprises a locking pin affixed to said first wheel assembly and movable therewith, said locking pin being engageable with a plate stationarily affixed to said frame and having two apertures therethrough positioned for receiving said locking pin to lock said first wheel assembly in said retracted and ground engaging positions, respectively, said locking pin being spring-loaded for engagement with said plate.

7. The crop harvesting header of claim 6 wherein said lower beam is of a box-like construction having a passageway extending transversely therethrough, said attachment means including a tongue telescopically received within said passageway, said tongue including a clevis for connection of said tongue to the source of motive power.

8. The crop harvesting header of claim 7 wherein said header further includes mounting means affixed to said frame to carry said second wheel assembly during the harvesting operation of said header when attached to said base unit.

9. The crop harvesting header of claim 8 wherein said axle can be stored in the passageway of said lower beam during the harvesting operation of said header, said lower beam being adapted adjacent the sidesheet spaced from said attachment means with a retention collar for selectively maintaining said axle therewithin.

10. The crop harvesting header of claim 9 wherein a jack is movably mounted on said frame proximate to said attachment means, said jack being movable between an unobstructing position and a ground engaging position to be operable for stationarily supporting a portion of said header above the ground.

11. The crop harvesting header of claim 10 wherein said jack is pivotally mounted to said frame for pivotal movement between said unobstructing position and said ground engaging position.

12. The crop harvesting header of claim 10 wherein the source of motive power is the base unit adapted for connection to the clevis on said tongue to transversely tow said header rearwardly thereof.

13. The crop harvesting header of claim 12 wherein said conveying means includes a transversely positioned auger rotatively mounted between said sidesheets rearwardly of said cutterbar to consolidate and discharge severed crop material through a centrally located aperture in said header to said base unit.

14. A crop harvesting header attachable to a mobile base unit and operable to initiate the crop harvesting process by severing standing crop material and conveying the severed crop material to the base unit for further harvesting treatment, comprising:
 a transverse frame including first and second spaced apart sidesheets defining the width of said header, said frame supporting a fore-and-aft extending floor positioned between said sidesheets;
 a cutterbar supported by said frame forwardly of said floor to sever standing crop material for deposit onto said floor, said cutterbar extending transversely between said sidesheets;
 conveying means cooperable with said floor to discharge severed crop material from said header to said base unit for further harvesting treatment;
 a first wheel assembly pivotally connected to said frame rearwardly of said floor and movable between a retracted position and ground engaging position to mobilely support a part of said header above the ground when in said ground engaging position, said first wheel means being aligned to direct any movement of said header in a transverse direction;

a second wheel assembly detachably connectable to said cutterbar forwardly of said first wheel means to mobilely support a part of said header above the ground when connected to said cutterbar, said second wheel means also being aligned such that said header is mobile in a transverse direction; and attachment means connected to said frame adjacent said first sidesheet for the detachable connection of said header to a motive power source, such that when said header is detached from said base unit, the header can be towed behind the motive power source.

15. The crop harvesting header of claim 14 wherein said second wheel assembly is connectable to said cutterbar in longitudinal alignment with said first wheel assembly, said first and second wheel assemblies being interconnected by an axle to provide stability between said first and second wheel assemblies.

16. The crop harvesting header of claim 15 wherein each of said wheel assemblies includes a support post generally vertically positioned when the respective said wheel means assembly is operatively supporting said header above the ground, a spindle extending through said support post and generally perpendicular thereto, said spindle having a first end and an opposing second end, and a wheel rotatably mounted on the first end of said spindle, said second end of said spindle being adapted for connection to said axle.

17. The crop harvesting header of claim 16 wherein said first wheel assembly support post is pivotally connected to said header frame, said second wheel assembly support post being attached to clamping means for detachably connecting said second wheel assembly to said cutterbar.

18. The crop harvesting header of claim 17 wherein a jack is pivotally mounted on said frame proximate to said attachment means, said jack being operable to stationarily support a portion of said header above the ground, said jack being pivotally movable to an unobstructing position.

19. The crop harvesting header of claim 17 wherein said header further includes mounting means affixed to said frame to carry said second wheel assembly during the harvesting operation of said header when attached to said base unit.

20. The crop harvesting header of claim 17 or 19 wherein said first wheel assembly includes locking means for securing said first wheel assembly in both said retracted position and said ground engaging position.

21. The crop harvesting header of claim 20 wherein said locking means comprises a locking pin affixed to said first wheel assembly and movable therewith, said locking pin being engageable with a plate stationarily affixed to said frame and having two apertures therethrough positioned for receiving said locking pin to lock said first wheel assembly in said retracted and ground engaging positions, respectively, said locking pin being spring-loaded for engagement with said plate.

22. The crop harvesting header of claim 17 wherein said frame includes a transverse lower beam of box-like construction and having a passageway extending therethrough in a transverse direction, said attachment means including a tongue telescopically received within said passageway, said tongue including a clevis for connection of said tongue to the source of motive power.

23. The crop harvesting header of claim 22 wherein said axle can be stored in the passageway of said lower beam during the harvesting operation of said header, said lower beam being adapted adjacent the sidesheet spaced from said attachment means with a retention mechanism for selectively maintaining said axle therewithin.

24. A method of transporting a crop harvesting header detachably connected to a mobile base unit and having a transverse cutterbar for severing standing crop material, comprising the steps of:

raising the header a predetermined height above the ground;

pivoting a first wheel assembly mounted on said header from a retracted position to a ground engaging position;

attaching a second wheel assembly to the header cutterbar;

lowering a jack mounted on said header at a position spaced from said first wheel assembly from an unobstructing position to a ground engaging position;

lowering said header until said first wheel assembly, said second wheel assembly and said jack engage the ground;

disconnecting the header from the mobile base unit;

connecting a vehicle to a clevis extending transversely from said header; and towing said header in a transverse attitude behind said vehicle.

25. The method of claim 24 further comprising the step of:

connecting said first wheel assembly to said second wheel assembly by an axle prior to towing said header.

26. The method of claim 25 further comprising the step of:

aligning said second wheel assembly with said first wheel assembly in a longitudinal direction prior to connecting the first wheel assembly to the second wheel assembly by an axle.

27. The method of claim 26 further comprising the step of:

telescopically extracting a tongue on which said clevis is mounted from within said header in a transverse direction prior to connecting a vehicle to said clevis.

28. The method of claim 27 further comprising the step of:

removing said second wheel assembly from its mounting position on said header prior to attaching said second wheel assembly to said cutterbar.

* * * * *